Sept. 20, 1960 W. GERMANN 2,952,916
CALLIPER SQUARES
Filed Sept. 16, 1958 4 Sheets-Sheet 1
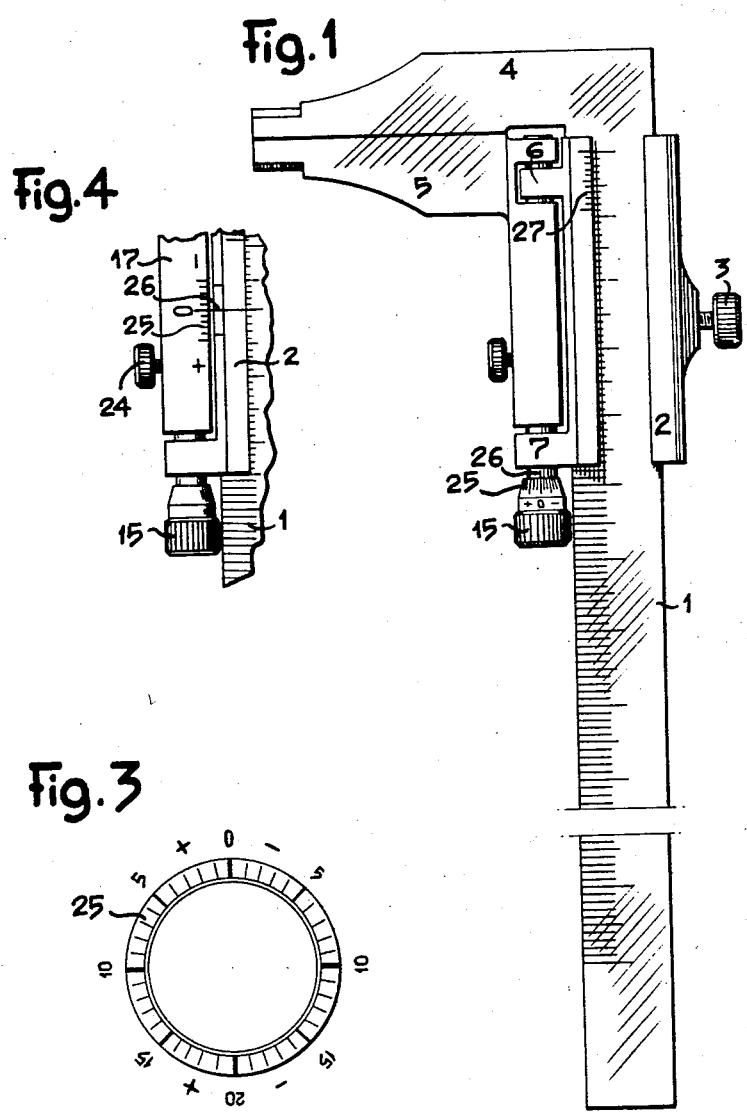
INVENTOR
WERNER GERMANN
BY
Emory L. Groff
ATTORNEY

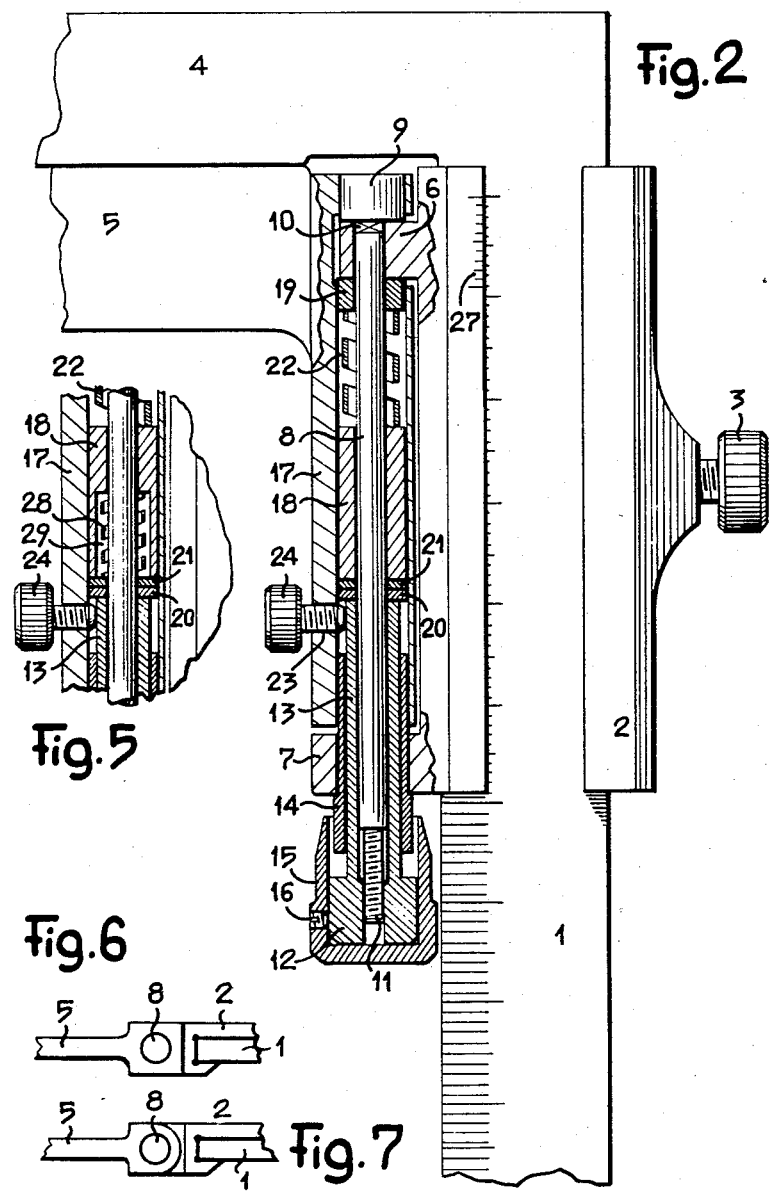

Sept. 20, 1960 W. GERMANN 2,952,916
CALLIPER SQUARES
Filed Sept. 16, 1958 4 Sheets-Sheet 3
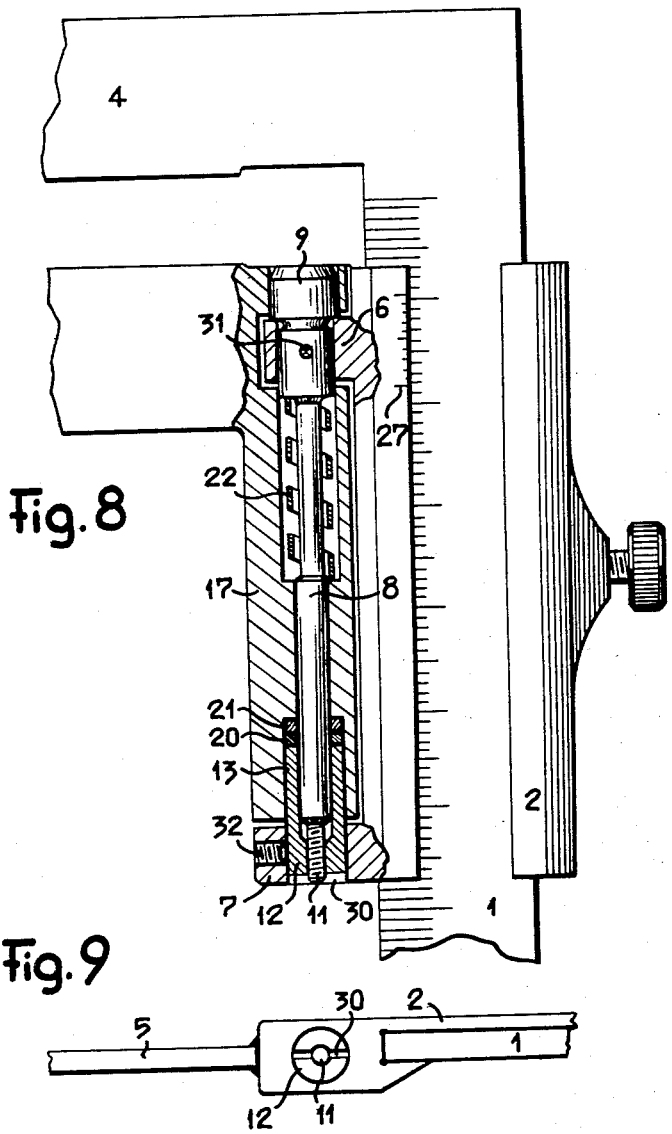
INVENTOR
WERNER GERMANN
BY Emory L. Groff
ATTORNEY

United States Patent Office 2,952,916
Patented Sept. 20, 1960

2,952,916

CALLIPER SQUARES

Werner Germann, Via Bottogno, Viganello-Lugano, Switzerland

Filed Sept. 16, 1958, Ser. No. 761,359

Claims priority, application Switzerland Sept. 21, 1957

4 Claims. (Cl. 33—143)

The present invention has for its subject a calliper square comprising a jaw secured to a graduated square and a jaw secured to a cursor movable along the scale.

Some calliper squares are already known provided with a second cursor attached to the usual cursor by an adjusting screw. In calliper squares of this type, the second cursor, or supplementary cursor, may be locked on the scale by means of a locking screw, the movement of the usual cursor being then effected by means of the adjusting screw connecting the two cursors one to the other. This construction thus facilitates precise measuring operations by means of a calliper square of this character. However, the construction of said calliper squares with a double slide is delicate and onerous by reason of the large number of parts to be machined with precision and with which these calliper squares are provided.

Further, these calliper squares are not very esthetic, precisely by reason of the presence of the supplementary cursor which increases the general encumbrance of the instrument.

The calliper square according to the invention is distinguished from known calliper squares by the fact that one of its jaws is movable axially relatively to its support (scale or slide) by means of a micrometer screw device in such a manner as to permit a fine adjustment of the calliper square.

A number of forms of construction of a calliper square according to the invention are shown diagrammatically and by way of example in the accompanying drawings, wherein:

Fig. 1 is a complete view of a calliper square according to a first form of construction.

Fig. 2 is a detail view, partly in section, of said first form of construction.

Fig. 3 is a detail view to a larger scale of this first form of construction.

Fig. 4 is a detail view of a first modification of this form of construction.

Fig. 5 is a partial section of a second modification of this form of construction.

Figs. 6 and 7 are end views of the cursor according to different constructions.

Fig. 8 is a partial view to a larger scale in section, of a second form of construction of the calliper square, of which Fig. 9 is a partial end view.

Figure 10:
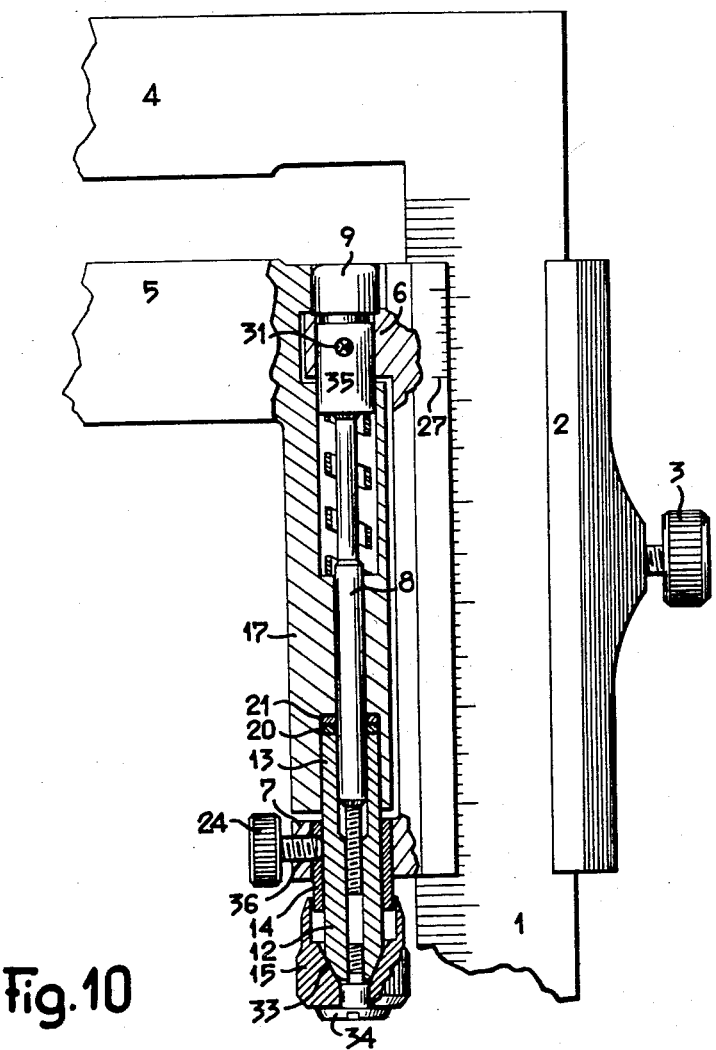
Fig. 10 is a view to a larger scale, partly in section, of a third form of construction of a calliper square.

With reference to Figs. 1 and 3, the calliper square shown comprises in the usual manner a graduated scale 1 on which is capable of sliding a cursor 2 which can be locked in position on the scale 1, by means of a locking screw 3. The scale 1 carries a jaw 4, integral therewith, whilst the cursor 2 carries a jaw 5 mounted thereon in such a manner as to be capable of being moved axially relatively to the cursor 2 by means of a micrometer screw device so as to permit of fine adjustment of the calliper square.

As will be seen clearly in Fig. 2, the cursor 2 has two lugs 6 and 7 each pierced with a bore. A rod 8, in the form of an elongated screw and having a head 9 of cylindrical shape is engaged in the lugs 6 and 7. Said rod 8 is provided at 10 with a flat engaged in a notch of corresponding shape of the lug 6 and prevents said rod from turning relatively to the lug 6. The end of said rod 8, engaged in the lug 7, has a threaded portion 11 on which is screwed a nut 12 extended by a portion in the form of a sleeve 13. Said part in the form of a sleeve 13 can slide in a sleeve 14 driven into the lug 7. The nut 12 is fitted with a head 15 in the form of a milled knob. Said head 15 is secured rigidly to the nut 12 by means of a locking screw 16.

The jaw 5 of the calliper square is provided with a tubular part 17 engaged around the rod 8. The internal bore of said part 17 corresponds to the external diameter of the sleeve 14 in such a manner that said part 17 can slide without clearance on the sleeve 14. A tube 18 is forced into the part 17, in the central part of the bore, in such a manner as to form a unit with said part 17. A sleeve 19 is fitted on the rod 8 in proximity to the lug 6. The external diameter of said sleeve 19 corresponds with the internal bore of the tubular part 17. The jaw 5 is therefore guided with precision by its tubular part 17 on the cursor 2 which serves as a support therefor, on the one hand, by the sleeves 14 and 19 and, on the other hand, by the cylindrical head 9. A predetermined clearance is left between the lug 6 and said same part 17 so that the jaw 5 can be moved axially relatively to the cursor 2 through a predetermined distance which may be selected of the order in size of one millimeter. A rigorous axial position of the jaw 5, relatively to the cursor 2, is obtained by reason of the fact that the internal extremity of the extension 13 of the nut 12 constitutes a stop. In fact, two steel washers 20 and 21 are fitted on the rod 8, the washer 20 being angularly solid with the extension 13, whilst the washer 21 is secured angularly to the tubular part 17. On the other hand, a spring 22 engages around the rod 8 between the tube 18 and the sleeve 19. Said spring 22 thus tends to maintain the washers 20 and 21 applied one against the other against the axial stop constituted by the extension 13. Said spring 22 thus has a tendency to space the jaws 4 and 5 one from the other by pushing the jaw 5 in the direction of the lug 7 of the cursor 2. Further, the tubular part 17 has a screwed bore 23 in which is engaged a screw 24 permitting of locking the jaw 5 axially relatively to the cursor 2.

As will be readily understood from what is shown in the drawing, any angular movement imparted to the milled knob 15 provokes an axial displacement of the washers 20 and 21 and this in turn, because of the effectively integral relationship between 17 and 18, causes the axial displacement of the jaw 5 with respect to its support, the cursor 2. A scale 25 is provided to permit of reading the value of the axial movement imparted to the movable jaw 5 relatively to the cursor 2. In the first form of construction, said scale 25 is marked circularly around the axis of rotation of the nut 12. In fact, this scale is marked on the milled head 15, see Figs. 1 and 3. Preferably, each stroke of said graduation 25 corresponds with an axial movement of the jaw 5 relatively to the cursor 2 of one hundredth of a millimeter. It is thus possible to read opposite to a mark 26 marked on the sleeve 14, the value of the axial movement imparted by the knob 15 to the sleeve 13. With a calliper square of this character, it is thus possible to bring the jaws 4 and 5 rapidly into immediate proximity of a part to be measured after which the cursor 2 is locked by means of the locking screw 3. The exact measurement of the size of the part under observation takes place by operating the micrometric screw device, constituted by the milled knob 15 until the jaws 4 and 5 come closely into contact with the part to be measured. The exact size of the part measured is obtained by making a first reading on the usual vernier 27 of the calliper square and adding to or deducting from, as may be necessary, the number found, the number of hundredths of a millimeter indicated on the graduation 25 opposite the mark 26.

In a first modification of this form of construction shown in Figs. 1 to 3, the graduation 25, instead of being marked circularly about the axis of rotation of the nut 12, may be marked on one of the two parts, movable jaw 5 and cursor 2.

In the modification shown in Fig. 4, the graduation 25 is marked on the tubular part 17 made integral with the jaw 5, the mark 26 being marked on the cursor 2. Reciprocally, the graduation 25 may therefore be marked on the cursor 2, the mark 26 being carried by the part 17. Similarly, in the form of construction shown in Fig. 1, the circular graduation 25 may be marked on the sleeve 14, the mark 26 being carried by the milled knob 15.

For reducing the force to be supplied for driving in rotation the milled knob 15, it is possible to incorporate in the tubular part 17 a second spring 28 (see Fig. 5) of a much weaker force than the first spring 22 and acting in the opposite direction on the movable jaw 5. A spring 28 of this character may be disposed in a seating 29 provided in the interior of the tube 18. The spring 28 thus bears, at one end, against the tube 18 and, on the other hand, against the washer 21. This construction, using two springs 22 and 28, permits of guaranteeing that the axial position of the jaw 5 is really rigorous against the stop constituted by the extension 13 and the washer 20, whilst considerably reducing the force which it is necessary to provide during the adjustment for driving the milled knob 15 in rotation. In fact, it suffices to overcome an axial force equal to the differences of the axial forces of the two springs 22 and 28 for moving the jaw 5 in the direction of the jaw 4 by means of the milled knob 15.

The construction described with reference to Figs. 1 to 5 may be applied to any usual calliper square. This construction may also be applied to calliper squares in which one of the jaws is hinged relatively to the other about an axis parallel to that of the scale 1.

In fact, it will be understood that the movable jaw 5, instead of being always guided parallel to the jaw 4, according to a construction shown in Fig. 6, may be hinged about the rod 8 which then constitutes a hinge axis of said jaw 5 (see Fig. 7). Such a calliper square therefore has two advantages consisting, on the one hand, in the presence of one jaw hinged relatively to the other and, on the other hand, in the presence of the micrometer screw device allowing of an axial movement of the movable jaw relatively to its support.

The form of construction shown in Figs. 8 and 9 has the same principal elements as those constituting the first form of construction. The elements having similar functions used in this second form of construction have the same references as those forming part of the first form of construction. However, in this second form of construction, the milled knob 15 is omitted as also the sleeves 14 and 19. In fact, the nut 12 slides directly on the lug 7. Said nut 12 is provided with means allowing of its drive by means of a tool. In the example shown, said nut 12 has a slot 30 in which a forked screw-driver can be engaged so as to allow of turning the nut 12. The rod 8 is no longer provided with a flat 10, this being replaced by a pin 31, driven transversely through a bore passing through the lug 6 and the rod 8. A screw 32 engaged in the lug 7 enables the nut 12 to be locked.

The micrometric screw device, with which the calliper square shown in Figs. 8 and 9 is provided, is adapted to allow of the adjustment of setting the calliper square at zero, particularly during its mounting, whilst the graduations are marked, on the one hand, on the scale 1 and, on the other hand, on the cursor 2.

Such a construction permits of effecting a rapid marking without great precision of the graduations carried by the scale and the cursor. The setting to zero, that is to say the precise adjustment of the cursor relatively to the jaw 5 which it carries, can then be effected by moving the nut 12 in one direction or the other for provoking the eventual necessary movement of the jaw 5 relatively to the cursor 2, then relatively to the vernier 27 already marked thereon. This construction of the calliper square permits of avoiding numerous inevitable wasters in the course of manufacture of usual calliper squares, by reason of the fact that the precise adjustment of the calliper square can take place in all cases, even when the marking of the graduations has not been effected with precision. Another advantage of this calliper square resides in the fact that it can be adjusted subsequently after long usage has provoked wear of the jaw 5, for example.

The form of construction shown in Fig. 10 has also the same principal members as those forming part of the form of construction shown in Fig. 2. However, in this last form of construction the milled knob 15 is fitted on the nut 12 by means of an assembly of cones 33 held tightened one against the other by a screw 34 engaged axially in the nut 12. In this form of construction, the tubular part 17 no longer bears against the sleeve 14 but actually directly on the extension 13 of the nut 12 in proximity to the lug 7. As regards the guide sleeve 19, this is replaced, in this form of construction, by a cylindrical part 35 of large cross-section provided on the rod 8. As in the form of construction shown in Fig. 8, said rod 8 is locked angularly in the lug 6 by means of a pin 31 engaged transversely in the two parts 6 and 8. As regards the locking screw 24, instead of being secured in the tubular part 17, it is engaged directly in a threaded hole 36 provided in the lug 7 and the sleeve 14. This last form of construction shown in Fig. 10, thus has the same advantages as that shown in Figs. 1 to 3.

All the forms of construction above described are capable of being applied either to usual calliper squares in which the two jaws 4 and 5 are always located in the same plane, or to calliper squares in which one of the jaws may be directed in a different plane relatively to the other.

Numerous modifications may be made in the construction of the calliper squares described above with reference to the accompanying drawings. It is particularly possible to construct calliper squares having the same advantages as those above described in which the jaw 4 carried by the scale 1 is capable of being moved axially relatively to this by means of a micrometer screw device of the same type as those hereinbefore described. In this case, the jaw 5 forms a single and same part with the cursor 2, as in calliper squares of the usual construction.

I claim:

1. A sliding calliper including, a graduated scale having a fixed jaw at one end, a cursor slidable along the length of said scale and having a vernier thereon, a movable jaw carried by said cursor and having means providing for axial movement between said movable jaw and cursor, said means comprising, in combination, upper and lower lugs, each having an opening therein, and projecting from said cursor in spaced apart relationship, a tubular member integral with said movable jaw and disposed between said upper and lower lugs, said tubular member having a reduced internal diameter portion therein intermediate said lugs, an axial rod passing through said openings and journalled in the reduced internal diameter portion of said tubular member, said rod having a threaded portion adjacent said lower lug, bearing means at the upper end of said tubular member for supporting said member on said rod, means for securing the upper portion of said rod within the upper lug to prevent rotary as well as axial movement thereof, a nut mounted on the threaded portion of said rod, said nut having a sleeve extending upwardly therefrom and surrounding the lower part of said rod to abut the reduced internal diameter portion of said tubular member, said sleeve passing through at least a part of said opening in the lower lug to slidably support the lower end of said rod within the lower portion of the tubular member and said lower lug, a spring within the upper portion of said tubular member, the upper end of said spring abutting said bearing means at the upper end of said tubular member, whereas the lower end of said spring abuts said reduced internal diameter portion to bias the tubular member and its integral jaw downwardly into abutting relation with the axial stop formed by the sleeve of said nut, whereby the axial position of the tubular member may be varied by rotation of said nut and related sleeve to permit fine adjustment of the movable jaw.

2. A sliding calliper according to claim 1 wherein said bearing means at the upper end of the tubular member comprises a second sleeve slidably disposed within said tubular member and fitted on said rod adjacent the upper lug.

3. A sliding calliper according to claim 1, wherein said bearing means at the upper end of the tubular member comprises an enlarged cylindrical part of said rod slidably fitted within said tubular member and fixedly mounted within said upper lug.

4. A sliding calliper according to claim 1, wherein said nut is countersunk within said lower lug and is provided with engaging means on its exposed portion for receiving a tool to effect the setting of the movable jaw.

References Cited in the file of this patent

UNITED STATES PATENTS

| | | |
|---|---|---|
| 522,053 | Gates | June 26, 1894 |
| 914,855 | Mastrangel | Mar. 9, 1909 |
| 945,144 | Ware | Jan. 4, 1910 |
| 1,526,305 | Neumaier | Feb. 10, 1925 |
| 1,969,624 | Salzbrenner | Aug. 7, 1934 |

FOREIGN PATENTS

| | | |
|---|---|---|
| 103,015 | Germany | May 12, 1899 |